US012798149B2

(12) United States Patent
Ribeiro Da Rocha

(10) Patent No.: US 12,798,149 B2
(45) Date of Patent: Nov. 17, 2026

(54) CERAMIC INJECTION PROCESS FOR MANUFACTURING SPRAY NOZZLES USING THE LOST CORE TECHNIQUE

(71) Applicant: SPRAYING SYSTEMS DO BRASIL LTDA, Sao Bernardo do Campo-SP (BR)

(72) Inventor: Edson Francelin Ribeiro Da Rocha, Sao Bernardo do Campo-SP (BR)

(73) Assignee: SPRAYING SYSTEMS DO BRASIL LTDA, Sao Bernardo Do Campo-SP (BR)

( * ) Notice: Subject to any disclaimer, the term of this patent is extended or adjusted under 35 U.S.C. 154(b) by 146 days.

(21) Appl. No.: 18/347,921

(22) Filed: Jul. 6, 2023

(65) Prior Publication Data

US 2024/0017441 A1 Jan. 18, 2024

(30) Foreign Application Priority Data

Jul. 12, 2022 (BR) .......................... 1020220138109

(51) Int. Cl.
*B28B 1/24* (2006.01)
*B28B 7/34* (2006.01)
*B28B 17/02* (2006.01)

(52) U.S. Cl.
CPC ................ *B28B 1/24* (2013.01); *B28B 7/342* (2013.01); *B28B 17/02* (2013.01)

(58) Field of Classification Search
CPC .................................. B28B 1/24; B28B 7/342
See application file for complete search history.

(56) References Cited

U.S. PATENT DOCUMENTS

| | | | |
|---|---|---|---|
| 6,350,404 B1 | 2/2002 | Li et al. | |
| 2008/0206497 A1 | 8/2008 | Hachiga et al. | |
| 2021/0276077 A1* | 9/2021 | Hearon | B28B 1/24 |

FOREIGN PATENT DOCUMENTS

| | | |
|---|---|---|
| JP | 2012031477 A | 2/2012 |
| KR | 20120032771 A | 4/2012 |

* cited by examiner

*Primary Examiner* — Nicholas Krasnow
(74) *Attorney, Agent, or Firm* — LUCAS & MERCANTI, LLP

(57) ABSTRACT

An injection processes for obtaining spray nozzles, more particularly, a process for injecting ceramics (ceramic inserts) for manufacturing spray nozzles through the use of so-called water stop, with high dimensional accuracy and complex internal geometries by dividing the process into main steps such as: injection of the water stop in polymeric material, overinjecting of ceramics using the polymeric core and removing the core through chemical dissolution; and secondary steps such as: chemical debinding or water debinding, thermal debinding and sintering.

9 Claims, 10 Drawing Sheets

CERAMIC INJECTION PROCESS FOR MANUFACTURING SPRAY NOZZLES USING THE LOST CORE TECHNIQUE

CROSS-REFERENCE TO RELATED APPLICATION

This application claims the benefit of priority from Brazilian patent application Ser. No. 10/202,20138109, filed Jul. 12, 2022, the content of which is incorporated herein by reference.

FIELD OF THE INVENTION

The present invention refers to the field of technologies related to injection processes for obtaining spray nozzles. More particularly, the present invention discloses a process for injecting ceramics (ceramic inserts) for manufacturing spray nozzles through the use of so-called lost core.

BACKGROUND OF THE INVENTION

The traditional ceramic material injection process consists of using conventional molds, using dummy pins and closing pins to define the internal geometry of the part. However, this process has limitations that are mainly related to the details in both the external and internal shape of the ceramic parts.

The ceramic injection process using the lost core was developed through the need to inject ceramics (spray nozzle inserts) to manufacture parts with high dimensional accuracy and complex internal geometries.

SUMMARY OF THE INVENTION

The present invention discloses a ceramic injection process (ceramic inserts) for manufacturing spray nozzles using the so-called lost core. In order to make it possible to inject the ceramic inserts of the spray nozzles using the lost core technique, it is necessary to divide the process into steps.

The main steps are:

injecting the lost core in polymeric material;

overinjecting ceramic using the polymer core; and removing core through chemical dissolution.

In order to obtain the ceramic part using the injection process using the lost core (insertion of spray nozzles), it is also necessary to carry out the following secondary steps:

chemical debinding or water debinding;

thermal debinding; and sintering.

BRIEF DESCRIPTION OF THE FIGURES

In order to obtain a complete visualization of the object of this invention, the figures of the present invention are presented in their preferred configuration.

DETAILED DESCRIPTION OF THE INVENTION

In order to be able to inject ceramics (ceramic inserts for spray nozzles) using the lost core technique, it is necessary to divide the process into steps. The main steps are:

injecting the lost core in polymeric material;

overinjecting ceramic using the polymer core; and removing core through chemical dissolution.

In order to obtain the ceramic part using the injection process using the lost core (insertion of spray nozzles), it is also necessary to carry out the following secondary steps:

chemical debinding or water debinding;

thermal debinding; and sintering.

Detailed Description of the Main Steps

Figure 1:
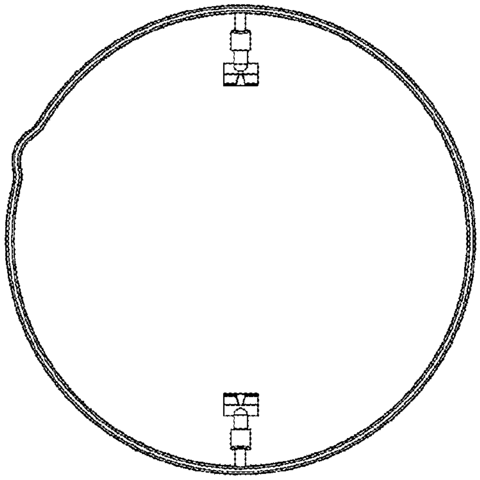
FIGS. 1, 2 and 3 illustrate configurations of the core to be used in the part manufacturing process.
Figure 2:
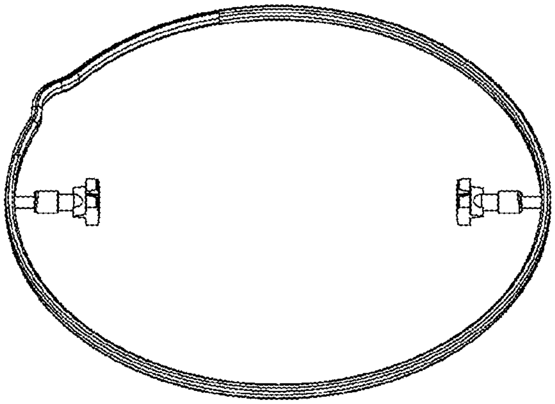
Figure 3:
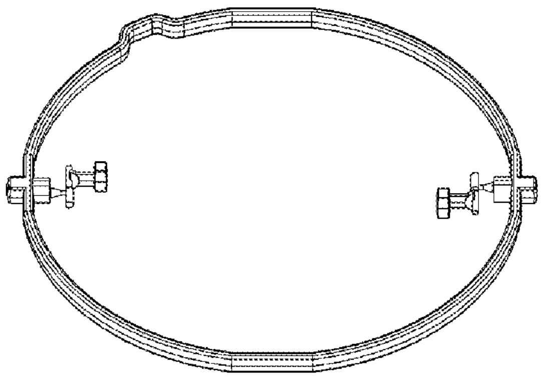

1) Injection of the Lost Core in Polymeric Material:

The injection of the lost core is made in polymeric material, as can be seen in FIGS. 1, 2 and 3. Currently, molds with two cavities are used for the injection of cores, with the possibility of increasing the number of cavities as needed.

For the injection of cores in polymeric material, the technical data sheets of the materials and injectors are used.

Figure 4:
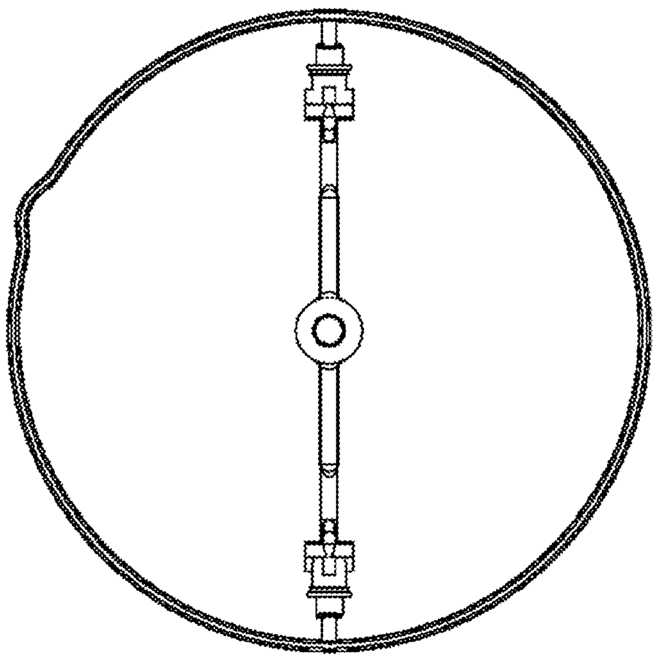
FIGS. 4 and 5 illustrate the ceramic injection into the core.
Figure 5:
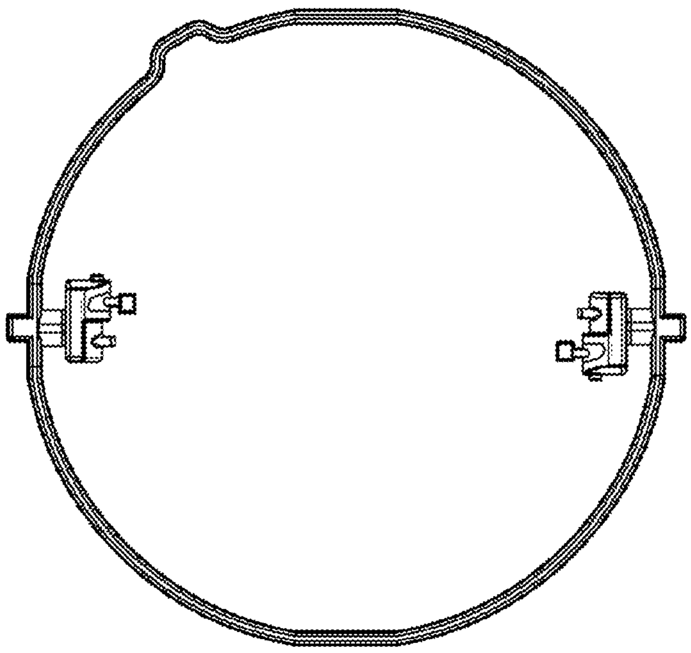

2) Ceramic Overinjecting Using the Polymeric Core:

For the step of overinjecting the ceramic using the lost core polymeric, a feedstock of ceramic material is used, which allows the injection of the ceramic, as can be seen in FIGS. 4 and 5.

Figure 6:
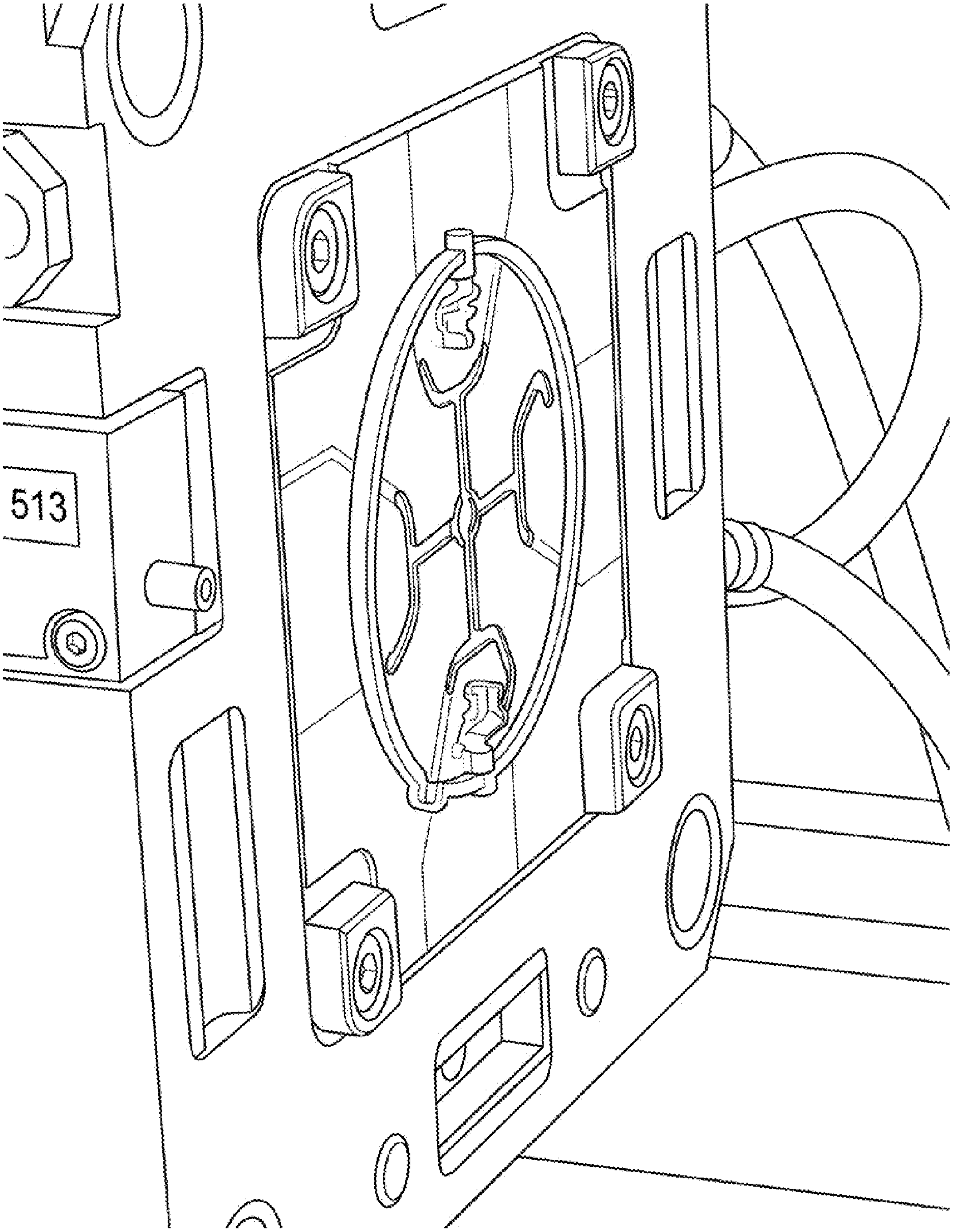
FIG. 6 illustrates the polymeric cores inserted inside the ceramic injection molds.

In order to make possible the overinjecting of the ceramic, the polymeric cores are inserted inside the ceramic injection molds, as shown in FIG. 6.

For the overinjecting of ceramics, the technical data sheets of the materials and injection machines are used.

Figure 7:
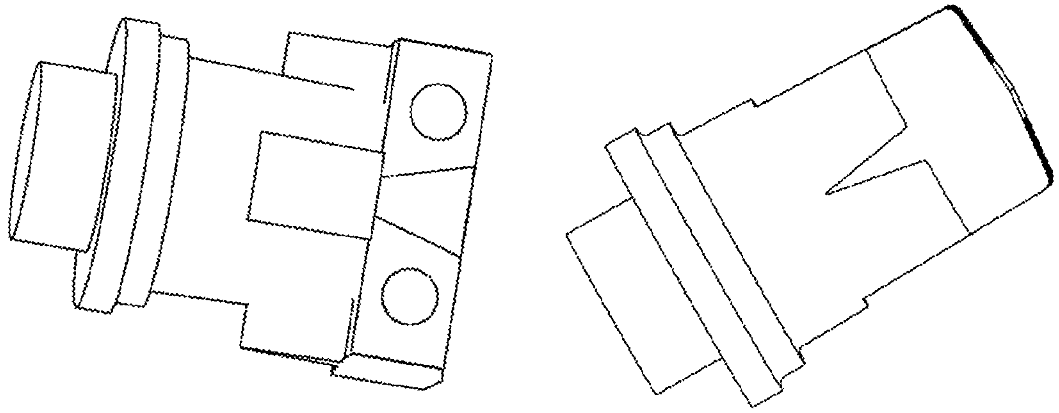
FIGS. 7 and 8 illustrate the core rods mechanically cut in order to reduce as much as possible the amount of polymeric material to be dissolved.
Figure 8:
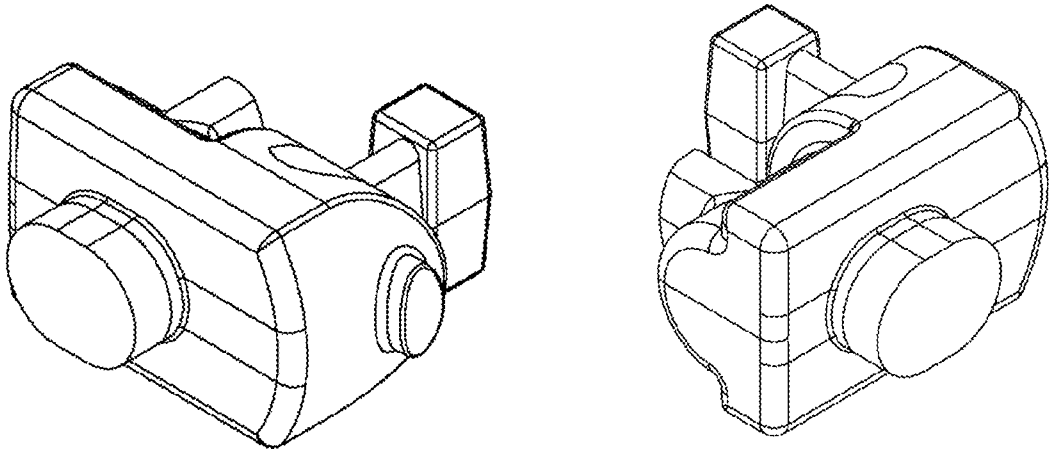

3) Removal of the Nucleus Through Chemical Dissolution:

After performing the ceramic overinjecting step, the core rods are mechanically cut in order to reduce the amount of polymeric material to be dissolved as much as possible, as can be seen in FIGS. 7 and 8.

For the chemical dissolution process of the polymeric cores, solvents are used to chemically dissolve the polymers.

Figure 9:
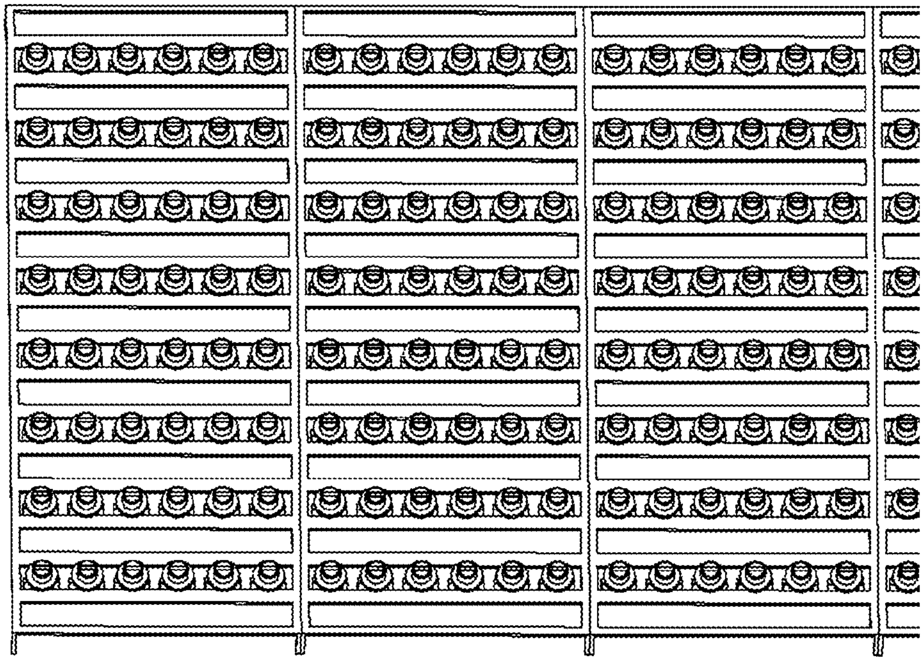
FIG. 9 illustrates the parts allocated in "cradles".
Figure 10:
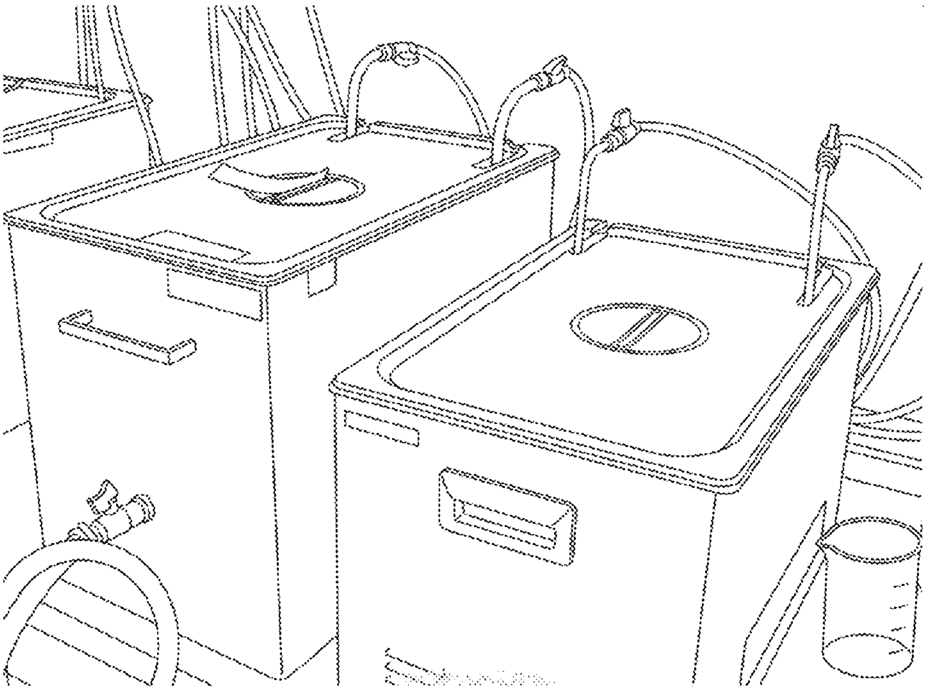
FIG. 10 illustrates ultrasound equipment used in the dissolution process of the parts.
Figure 11:
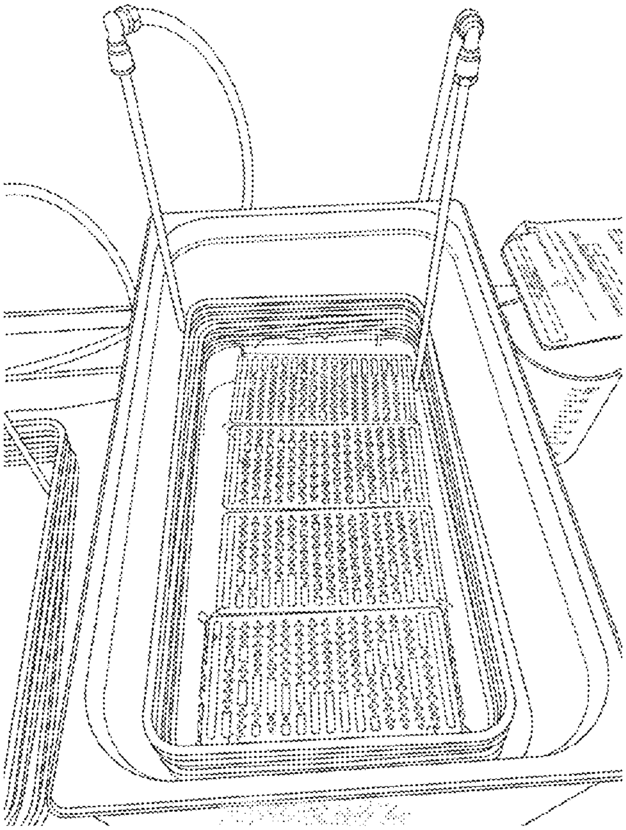
FIG. 11 illustrates the parts being immersed in the solvent.

To optimize the dissolution process, the parts are placed in "cradles" as shown in FIG. 9. In addition, temperature-controlled ultrasound equipment is used, as shown in FIG. 10. FIG. 11 shows the parts being dipped in the solvent. In the dissolution process, it must be ensured that 100% of the polymeric material has been removed.

Figure 12:
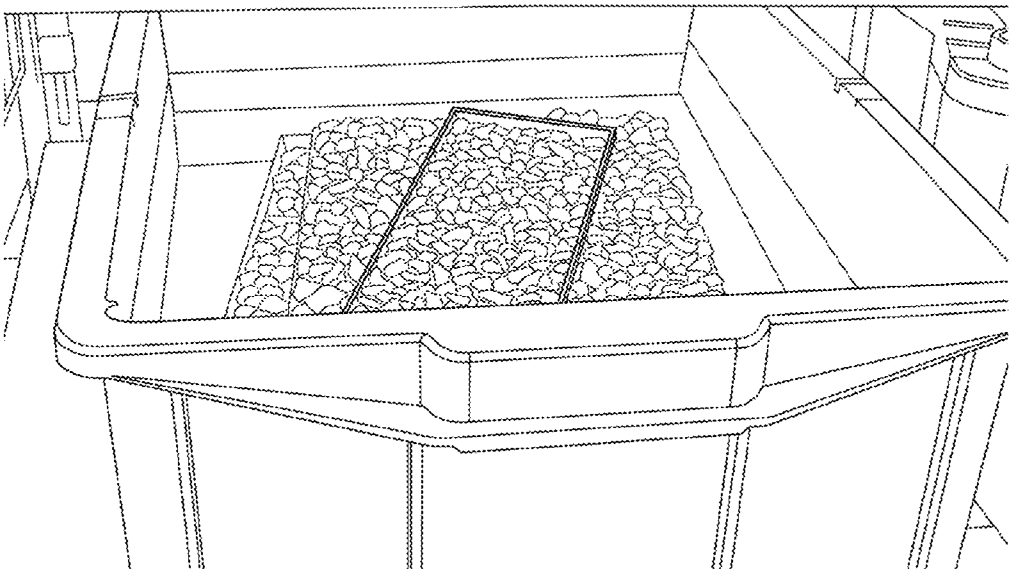
FIG. 12 illustrates the pieces placed in perforated stainless steel trays.
Figure 13:
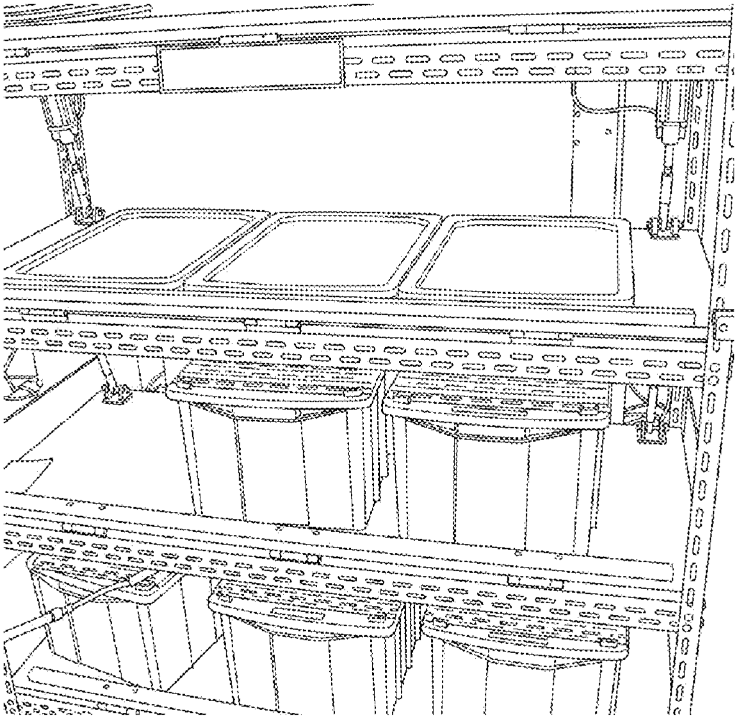
FIG. 13 illustrates the PP boxes positioned on shelves.

In another method used in the dissolution process using solvent, the parts are placed in perforated stainless steel trays, as can be seen in FIG. 12. Such trays are placed in polymeric boxes and are positioned on shelves which are constantly moved by pneumatic drive. FIG. 13 shows the boxes positioned on the shelves. Thus, there is constant movement of the solvent at room temperature, ensuring the complete dissolution of the polymer.

Figure 14:
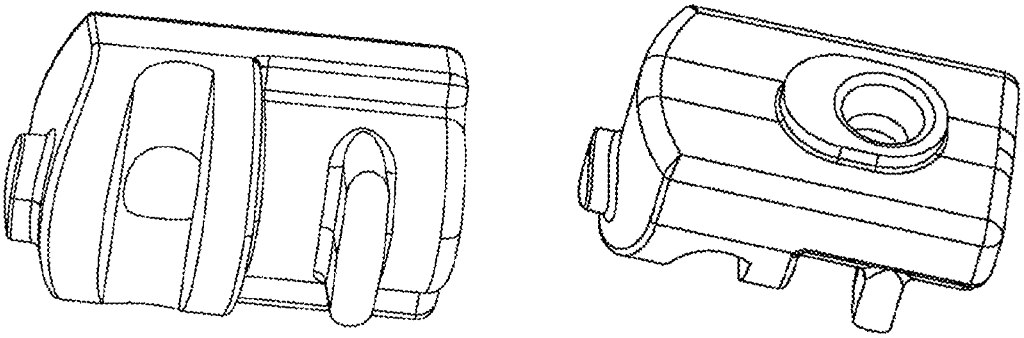
FIGS. 14, 15 and 16 illustrate some models of parts obtained after chemical dissolution.
Figure 15:
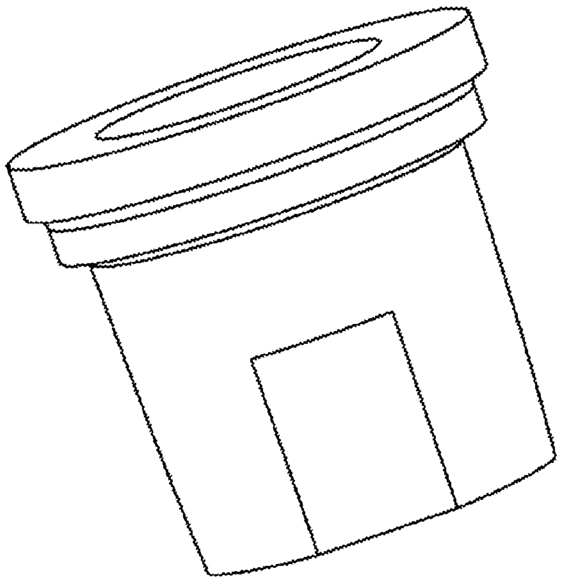
Figure 16:
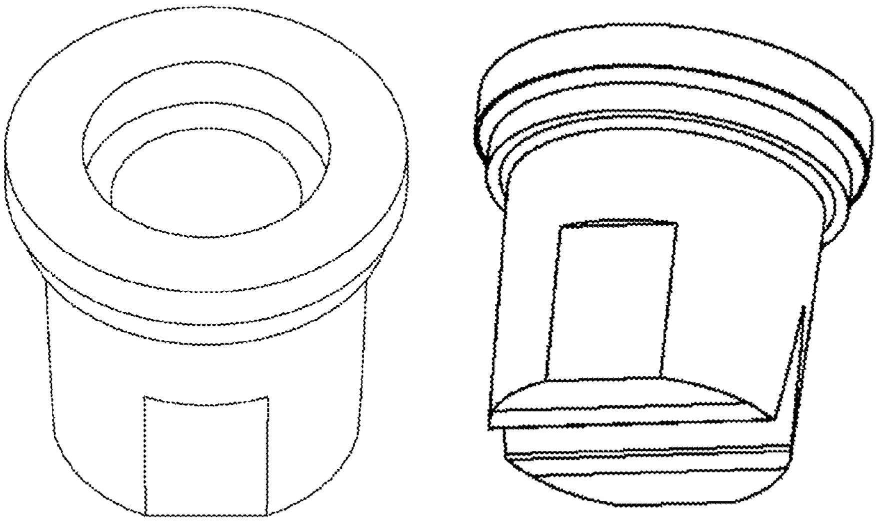

After the chemical dissolution process, it is possible to obtain the ceramic part (ceramic insert) from the spray nozzle in which the ceramic injection process was used, using the lost core polymer. FIGS. 14, 15 and 16 illustrate some models of parts obtained after chemical dissolution.

After this step, the ceramic parts follow the processes of chemical/water and thermal debinding and, later, the sintering process according to the data sheet of the feedstock used to finalize the production process. Such processes are carried out through the so-called secondary steps, which are common in the manufacture of industrial technical ceramic parts.

Detailed Description of the Secondary Steps

4) Chemical Debinding and Water Debinding-Processes to Start Removing the Feedstock Binder:

In Water Debinding, parts are placed in perforated stainless steel trays and submerged in water at a specific temperature and time.

In chemical debinding, the parts are placed in stainless steel trays that are submerged in solvent at room temperature in boxes that are placed on shelves with pneumatic activation to move the solvent.

5) Thermal Debinding (Pre-Sinter)-Process to Remove the Binder from FEEDSTOCK.

Figure 17:
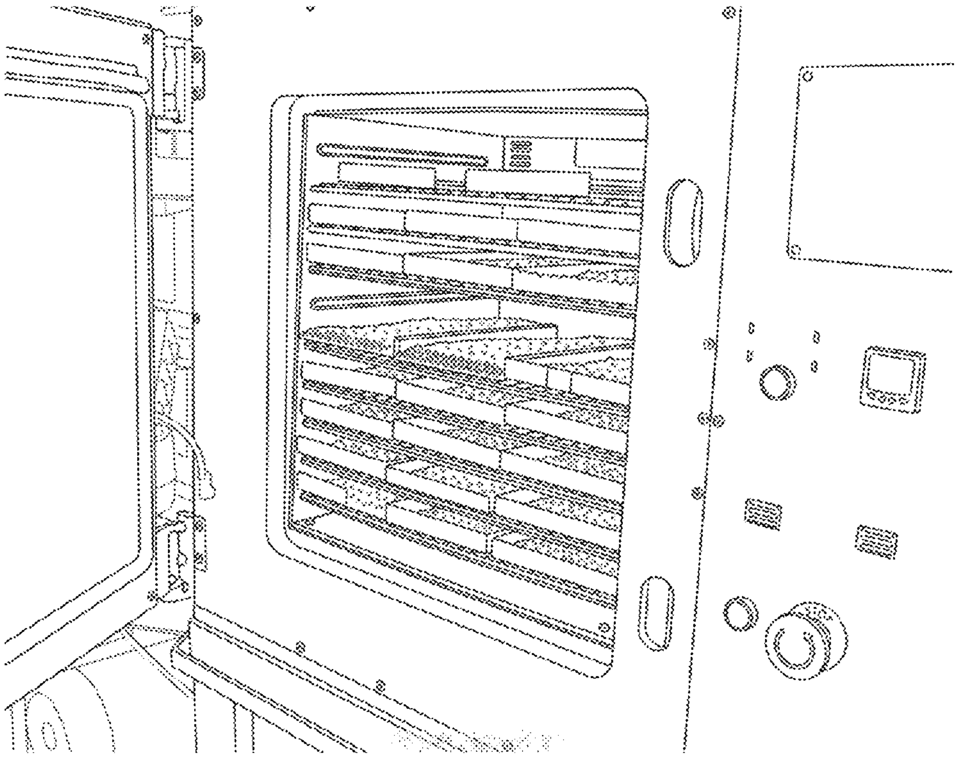
FIG. 17 illustrates the parts positioned inside the oven.

This process consists of heating the parts in an oven at around 300° C. FIG. 17 shows the parts positioned inside the oven.

Figure 18:
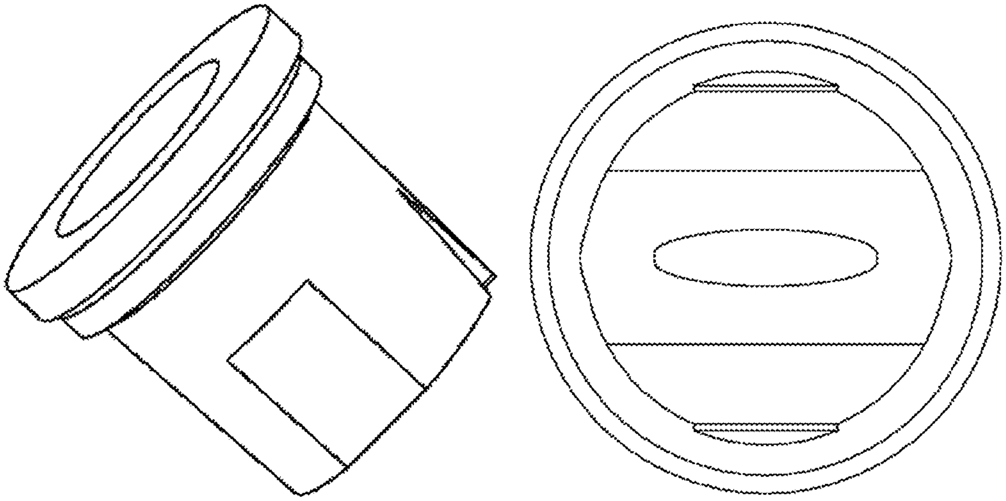
FIG. 18 illustrates the parts with a brown visual appearance after the thermal debinding process.

After the thermal debinding process (pre-sinter), the parts have a brown visual appearance, as shown in FIG. 18.

Figure 19:
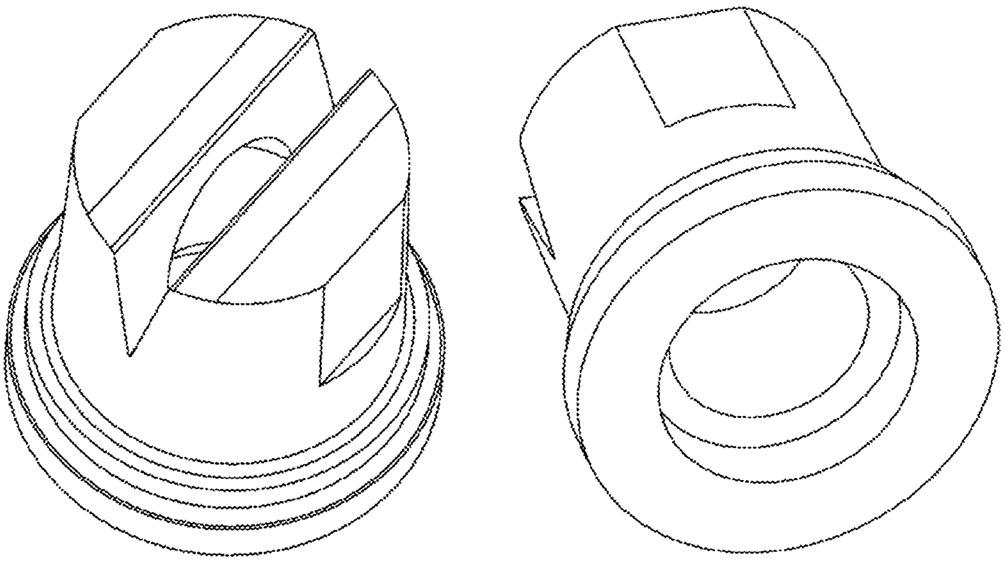
FIG. 19 illustrates the parts with a white visual appearance after the sintering process.

6) Sintering:

Sintering is the last stage of the ceramic production process, in which the objective is to sinter the ceramic. It consists of a stage of heating the part in an oven at around 1600° C. After the sintering process, the parts look white, as shown in FIG. 19.

The invention claimed is:

1. A ceramic injection method for manufacturing spray nozzles, the method comprising:

inserting a polymeric core comprising a polymeric material inside a ceramic injection mold;

overinjecting a ceramic material in the ceramic injection mold using a feedstock of a ceramic material, forming a ceramic part around the polymeric core;

dissolving the polymeric material of the polymeric core by chemical dissolution using one or more solvents;

mechanically cutting one or more core rods associated with the polymeric core;

subjecting the ceramic part to at least one of a chemical debinding process or a water debinding process to remove the feedstock binder;

subjecting the ceramic part to a thermal debinding process to remove the binder from the feedstock; and subjecting the ceramic part to a sintering process.

2. The method according to claim 1, wherein the step of dissolving the polymeric material of the polymeric core by chemical dissolution using one or more solvents further comprises placing one or more parts in cradles and using ultrasound equipment, with controlled temperature.

3. The method according to claim 1, wherein the step of dissolving the polymeric material of the polymeric core by chemical dissolution using one or more solvents further comprises placing one or more further comprises placing one or more parts in perforated stainless steel trays and placing the perforated stainless steel trays in boxes and positioned on shelves which are constantly moved.

4. The method according to claim 3, wherein movement of the shelves optimizes the dissolution process.

5. The method according to claim 3, wherein movement of the shelves takes place by pneumatic actuation.

6. The method according to claim 1, wherein subjecting the ceramic part to the water debinding process further comprises placing one or more parts in perforated stainless steel trays and submerged in water with controlled temperature and time.

7. The method according to claim 1, wherein subjecting the ceramic part to the chemical debinding process further comprises placing one or more parts in stainless steel trays that are submerged in the one or more second solvents at room temperature in boxes that are placed on shelves with pneumatic drive for solvent movement.

8. The method according to claim 1, wherein subjecting the ceramic part to the thermal debinding process comprises heating one or more parts in an oven at 300° C.

9. The method, according to claim 1, wherein subjecting the ceramic part to the sintering process comprises heating one or more parts in an oven at 1600° C.

* * * * *